United States Patent
Lockhart

(10) Patent No.: US 6,173,189 B1
(45) Date of Patent: Jan. 9, 2001

(54) METHOD AND APPARATUS FOR MULTI-PROTOCOL REVERSE CHANNEL INFRASTRUCTURE SHARING

(75) Inventor: Thomas Wayne Lockhart, Vancouver (CA)

(73) Assignee: Motorola, Inc., Schaumburg, IL (US)

( * ) Notice: Under 35 U.S.C. 154(b), the term of this patent shall be extended for 0 days.

(21) Appl. No.: 09/215,813

(22) Filed: Dec. 18, 1998

(51) Int. Cl.⁷ .................................................. H04B 1/38
(52) U.S. Cl. ........................ 455/561; 455/552; 455/553
(58) Field of Search ................................. 455/561, 560, 455/552, 553, 450, 38.1, 424, 426; 370/433, 468, 469

(56) References Cited

U.S. PATENT DOCUMENTS

| | | | |
|---|---|---|---|
| 5,664,004 | 9/1997 | Durchman et al. | 455/466 |
| 5,809,397 | * 9/1998 | Harthcock et al. | 455/13.2 |
| 5,983,110 | * 11/1999 | Kohler et al. | 455/462 |
| 5,995,850 | * 11/1999 | Goud et al. | 455/560 |
| 6,034,949 | * 3/2000 | Gellhaus et al. | 370/252 |
| 6,035,212 | * 3/2000 | Rostoker et al. | 455/552 |
| 6,070,090 | * 5/2000 | Feuerstein | 455/561 |

* cited by examiner

Primary Examiner—Reinhard J. Eisenzopf
Assistant Examiner—Duc Nguyen
(74) Attorney, Agent, or Firm—Pablo Meles; Philip P. Macnak

(57) ABSTRACT

A base station (222) capable of receiving reverse channel data using two over the air protocols preferably comprises a transmitter (224) and modulator (226) for forward channel transmissions in at least a first protocol, a multi-mode base receiver (228) capable of receiving data on a reverse channel using multiple protocols including the first protocol and at least a second protocol. The dual mode base station further comprises a processor (242) that receives a timing source for the second over the air protocol derived from the remote controller (216) for the second over the air protocol. The processor is preferably programmed to decode timing information from the timing source allowing the multi-mode base receiver 228 to provide a busy indicator to the transmitter 224 and modulator 226 to inhibit the reverse channel of the first over the air protocol during a period set by the busy indicator.

20 Claims, 4 Drawing Sheets

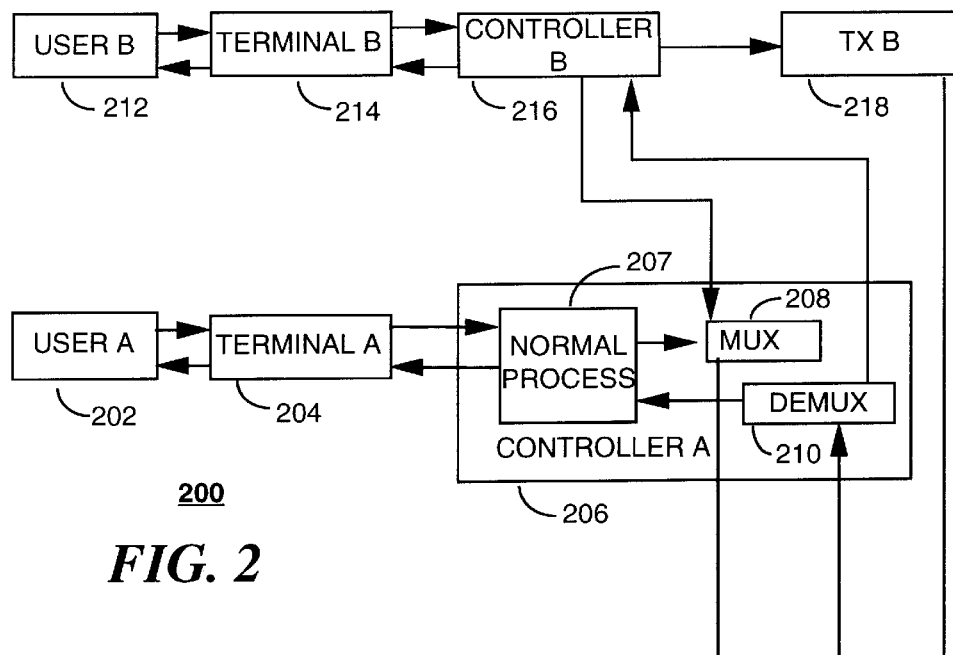
FIG. 2
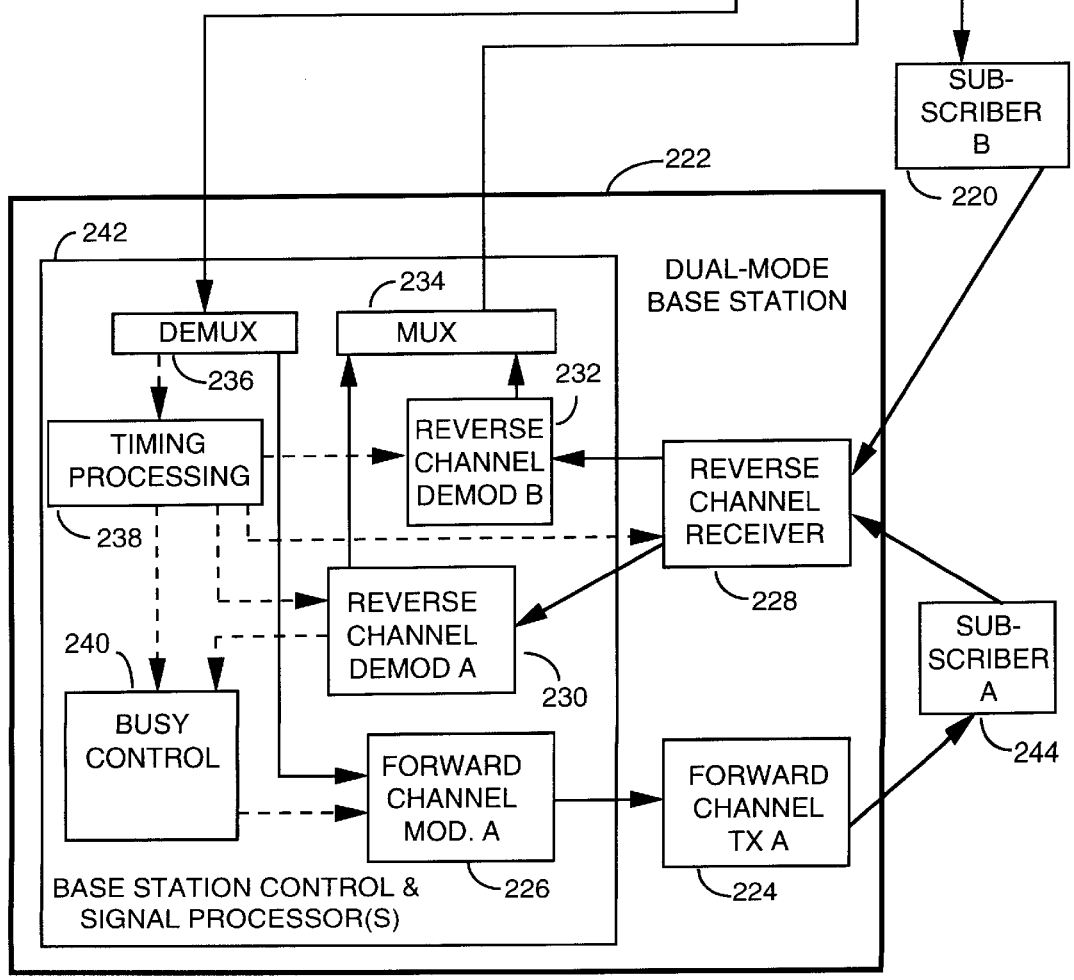

METHOD AND APPARATUS FOR MULTI-PROTOCOL REVERSE CHANNEL INFRASTRUCTURE SHARING

FIELD OF THE INVENTION

The present invention is directed to wireless communication infrastructure sharing, and more particularly to reverse channel infrastructure that can handle multiple protocols for radio data networks.

BACKGROUND OF THE INVENTION

For a wireless data network operator to operate two or more wireless protocols such as a DataTAC® network and a ReFLEX™ 25 network employing today's technology would require two distinct networks, operating in parallel. They would not be able to share channels or equipment efficiently.

A minor variation, would allow the sharing of the base station links (a significant cost item) by adding multiplexers and demultiplexers at each end of the links. This has however never been done and there may be difficulties of which we are unaware, such as timing effects (additional latency variation) caused by the shared links.

Another technique that could be used would allow the two dissimilar systems to simply "aloha" on top of each other. This means that each network would ignore the other, but share the radio channels and receivers. The receivers would be capable of receiving and demodulating either of the dissimilar protocols. There would be many collisions with this mechanism, and they would significantly impair the capacity of the reverse channels of both systems. Also, this technique would require the DataTAC system to operate in single frequency mode, which is not the normal mode of operation for DataTAC 5000 networks. In any case, the method claimed herein is significantly different and avoids the detriments described above.

A similar but different prior technology for sharing channels occurs in (cellular digital packet data) CDPD networks, when the CDPD channels are shared with AMPS voice channels. The technique used in this case involves "channel hopping", which basically requires the CDPD channel to move to a different frequency when the CDPD base station detects voice activity on the shared channel. This is also a completely different (and less effective) technique than will be described with the present invention.

BRIEF DESCRIPTION OF THE DRAWINGS

FIG. 2 is a block diagram of a communication system using a dual-mode base station in accordance with the present invention.

DETAILED DESCRIPTION

Figure 1:
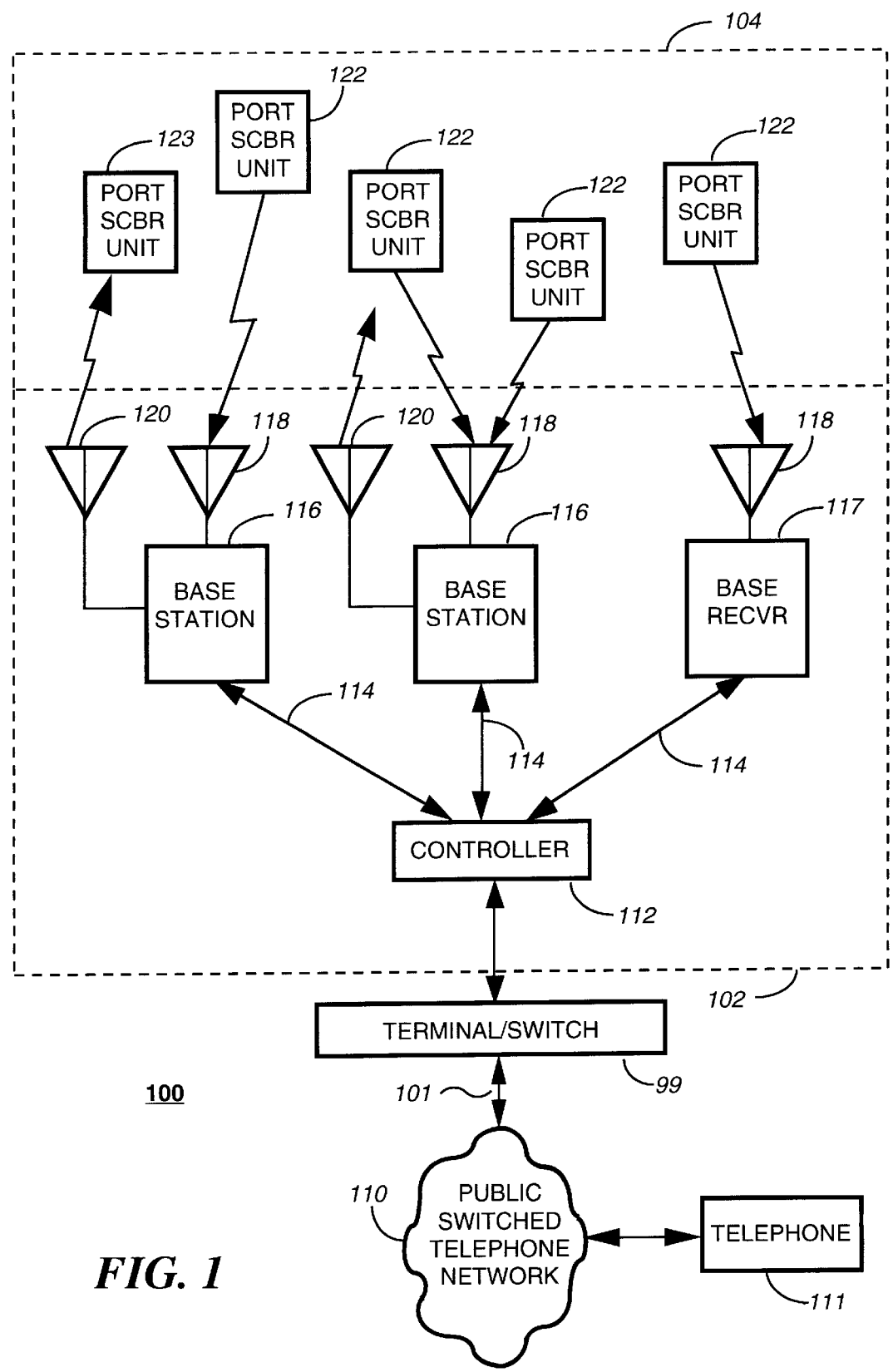
FIG. 1 is a block diagram of an existing two-way messaging system.

Referring to FIG. 1, a block diagram of an existing communication system 100 shown having a fixed portion 102 and a portable portion 104. The fixed portion 102 comprises a plurality of conventional base transceivers which are base stations 116 coupled by communication links 114 to a controller 112 for controlling the base stations 116. Additionally, there may be base receivers 117 coupled by communication links 114 to the controller 112 for controlling the base receivers 117 The hardware of the controller 112 is preferably similar to the RF-Conductor!™ (RF-C) controller manufactured by Motorola, Inc. of Schaumburg, Ill.. The hardware of the base stations 116 is preferably similar to the Nucleus® II transmitter and the RF-Audience™ both manufactured by Motorola, Inc. of Schaumburg, Ill. Other similar hardware can be utilized as well for the controller 112, base stations 116, an base receivers 117. Messages are directed to and from the fixed portion via a terminal 99 or switch such as the Wireless Messaging Gateway™ (WMG) manufactured by Motorola.

Each of the base stations 116 transmits radio signals to the portable portion 104 comprising a plurality of portable subscriber units 122 and 123 via a transmitting antenna 120. Note that either a selective call transceiver 122 or a selective call receive 123 may be used if configured appropriately. The base stations 116 each receive radio signals from the plurality of portable subscriber units 122 via a receiving antenna 118 coupled to a base receiver within the base station (or to the stand alone base receiver in the case of base receiver 117). The radio signals comprise selective call addresses and messages transmitted to the portable subscriber units 122 and 123 and acknowledgments received from the portable subscriber units 122. It will be appreciated that the portable subscriber units 122 can also originate messages other than acknowledgments. The controller 112 and terminal 99 preferably are coupled to a conventional telephone 111 via telephone links 101 and a public switched telephone network (PSTN) 110 for receiving selective call originations therefrom. Selective call originations comprising voice and data messages from the PSTN 110 can be generate for example, from the conventional telephone 11 1 coupled to the PSTN 110 in a manner that is well known in the art. In the description above, the telephone 111 an PSTN 110 could also represent respectively a computer and a data communication network such as the Internet.

Data and control transmissions between the base stations 116 and the portable subscriber units 122 and 123 preferably utilize a well-known digital selective call signaling protocol, such as the Motorola FLEX™ family of protocols. It will be appreciated that other similar protocols can be utilized as well. These protocols utilize well-known error detection and error correction techniques and are therefore tolerant to bit errors occurring during transmission, provided that the bit errors are too numerous in any one code word.

Forward channel transmissions comprising data and control signals from the base stations 116 may utilize two- and four-level frequency shift keyed (FSK) modulation operating at sixteen-hundred or thirty-two-hundred symbols-per-second (sps), depending on traffic requirements and system transmission gain. Inbound or reverse channel transmissions from the portable subscriber units 122 to the base stations 116 may utilize four-level FSK modulation at a rate of ninety-six-hundred bits per second (bps). Inbound channel transmissions preferably occur during predetermined data packet time slots synchronized with the forward channel transmissions. It will be appreciated that, alternatively, other signaling protocols, modulation schemes, and transmission rates can be utilized as well for either or both transmission directions. The outbound and inbound channels can operate on a single carrier frequency utilizing well-known time division duplex (TDD) techniques for sharing the frequency. It will be appreciated that, alternatively, frequency division duplex (FDD) can be utilized as well for the outbound and inbound channels.

U.S. Pat. No. 4,875,038 to Siwiak et al., which describes a prior acknowledge-back selective call communication system, is hereby incorporated herein by reference. For further information on the operation and structure of an acknowledge-back selective call communication system, please refer to the Siwiak et al. patent.

The present invention facilitates sharing of infrastructure equipment by allowing a single set of reverse channel infrastructure equipment (and possibly radio channels) to provide reverse channel services for two distinct radio data networks, such as a DataTAC® 5000 network and a ReFLEX™ 25 network, effectively simultaneously. This would allow for example, a DataTAC network operator with equipment enhanced as described below, to operate a ReFLEX network as well, wi little or no additional costs (either capital or operating) for operating the reverse channel.

Referring to FIG. 1, an existing two-way network is described. Referring to FIG. 2, a multi-protocol communication system 200 is shown that is capable of sharing infrastructure as well as a reverse channel. Basically, the invention shares the reverse channel of two dissimilar radio channel protocols, by switching a dual-mode receiver 228 between the two reverse channel protocols using two corresponding demodulators (demodulator 230 for RD-LAP and demodulator 232 for ReFLEX), while inhibiting reverse channel activity on the protocol which is not currently be received. While this technique could be used to share the reverse channels of any two dissimilar protocols for which the central site controllers can predict and/or control reverse channel activity, for example RD-LAP and Mobitex, it is particularly valuable for the case of RD-LAP and ReFLEX protocols. The present invention is described in specific terms for sharing the reverse channels of RD-LAP and ReFLEX since it is easier to understand a specific case, but it should be understood that the techniques claimed and disclosed have broader applicability.

In the example shown, network A represents a RD-LAP network and network B represents a ReFLEX network. Network A would typically include a user input 202 (such as a telephone or computer preferably coupled through a PSTN (not shown), a terminal 204 such as a radio network gateway (RNG), a central site controller 206 such as a Radio Network Controller (RNC), as well as a forward channel transmitter 224 and corresponding modulator 226. Network B would typically include a user input 212, a terminal 214 such as Motorola's Wireless Messaging Gateway (WMG) terminal, a central site controller 216 such as Motorola's RF-Conductor or RF-C, as well as a forward channel transmitter 218 (and corresponding modulator-not shown). Thus, the present invention further requires a dual-mode base station 222, which is capable of receiving and decoding both RD-LAP and ReFLEX™-25. This is straightforward, being accomplished simply by enhancing an existing RD-LAP base station, such as the DSS-8000 to include ReFLEX reception logic. The present invention also requires that the dual-mode base station be provided with timing information as to when ReFLEX reverse channel signals are expected. Such signals are expected during the ReFLEX aloha interval, as well as at times that the RF-C has scheduled reverse channel messages. This timing information is used by a timing processing element 238 within the dual-mode mode base station 222 for several purposes. First, it is used to set the RD-LAP reverse channel busy indication, preferably via a busy control element 240. Second, it causes the base station receiver to prepare to receive the ReFLEX protocol, by switching channels, changing radio filters, changing demodulation techniques, or other preparations as required. Finally, the timing information is used to reverse the last steps. That is, it is used to signal the dual-mode base station to prepare to receive RD-LAP again and to clear the RD-LAP reverse channel busy indication. This reversion to RD-LAP could be done either upon receipt of further timing information, or upon the expiration of a predetermined time.

The dual-mode base station identifies all information it decodes from reverse channel transmissions from RD-LAP subscriber unit(s) 244 or from ReFLEX subscriber unit(s) 220 as either RD-LAP or ReFLEX information, and forwards it back to the RD-LAP central site controller 206, i.e. the RNC via the multiplexer 234. The RNC then demultiplexes via a demultiplexer 208 the data based on this identification and forwards information identified as from ReFLEX to the ReFLEX central site controller 216, i.e., the RF-C. The information identified as from RD-LAP is processed as would normally be done through a normal processing element 207 in the RNC or central site controller 206.

Figure 3:
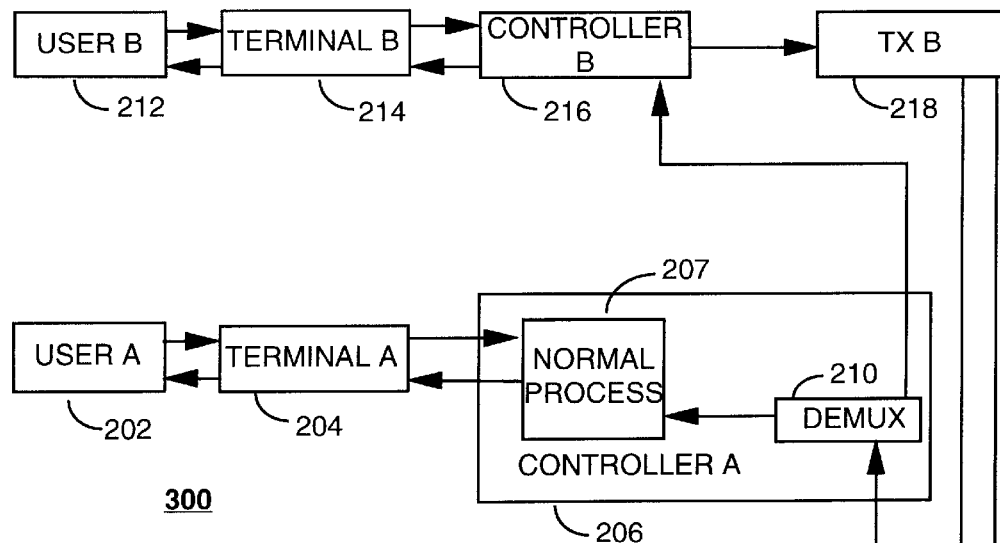
FIG. 3 is a block diagram of another communication system using a dual-mode base station in accordance with the present invention.
Figure 3:
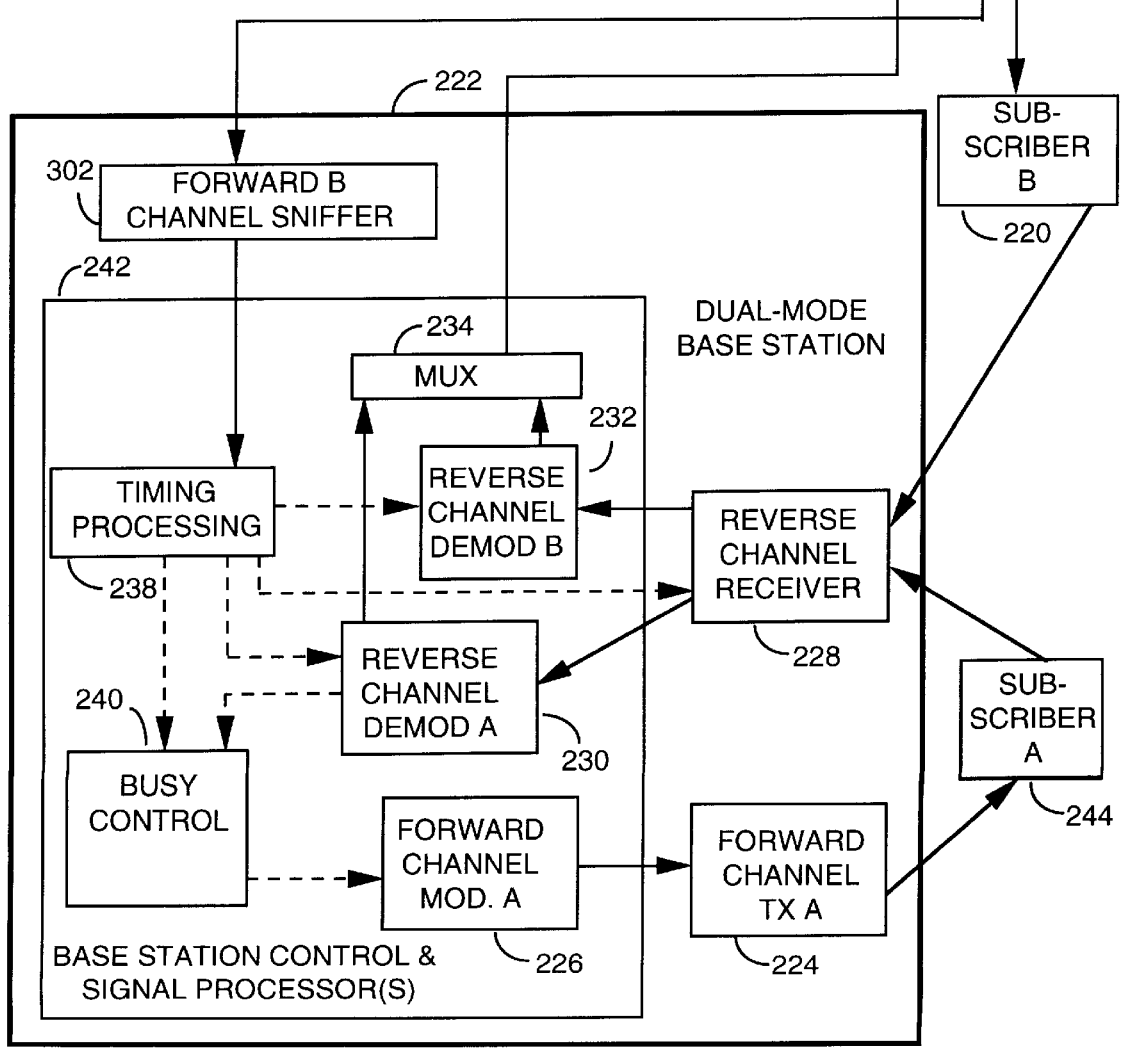

The timing information required by the base station could come from two distinct sources, although any given implementation would likely use only one method. The first method requires the controller 216 (or RF-C) of network B (ReFLEX) to compute the timing information and send it via a multiplexer 208 in the RNC to the dual-mode base station via a demultiplexer 236. The second method as shown in FIG. 3 requires the base station to include a sniffer 302 (i.e. a special receiver) for ReFLEX. The sniffer 302 would monitor the ReFLEX forward channel and determine when ReFLEX reverse channel activity was expected. The multiprotocol communication system 300 of FIG. 3 would essentially be configured and constructed similar to the communication system 200 of FIG. 2 except that sniffer 302 would essentially eliminate the need for a multiplexer (208) in the controller 206 of the RD-LAP network and the corresponding demultiplexer (236) in the dual mode base station 222.

The first method has the advantage of not requiring any changes to the base station hardware (i.e. no sniffer required), but it would require software changes to both the RF-C and RNC. The second method has the advantage of not requiring software changes to the RF-C, but would still require software changes to the RNC, to demultiplex and forward ReFLEX data to the RF-C. The second method also requires the creation of the sniffer, which could be quite expensive. It should be understood that the claims of the present invention contemplate both the method and apparatus described in general as well as the use of either timing source methods.

Referring once again to FIG. 2, a base station 222 in a radio communication system 200 capable of receiving reverse channel data using two over the air protocols preferably comprises a transmitter 224 and modulator 226 for forward channel transmissions in at least a first over the air protocol (RD-LAP for example), a multimode base receiver 228 capable of receiving data on a reverse channel using multiple over the air protocols including the first protocol and at least a second over the air protocol (such as ReFLEX®25). Preferably, a multiplexer 234 multiplexes information for at least the second protocol and for the first protocol received through the multi-mode base receiver wherein a demultiplexer 210 in a remote controller 206 for the first protocol redirects data either for normal processing (207) at the controller 206 in the first protocol or for processing in the second protocol at another remote controller 216. The dual mode base station 222 further comprises a processor 242 and receives a timing source for the second over the air protocol derived from the remote controller 216 (such as a ReFLEX remote controller via a multiplexer 208 in the RD-LAP remote controller 206) for the second over the air protocol. The multiplexed timing information would preferably then be demultiplexed using a demultiplexer 236 at the dual mode base station 222. The demultiplexer 236 demultiplexes forward channel data of the first over the air protocol and timing information from the remote controller for at least the second protocol. Alternatively, referring to FIG. 3, the timing source for the second over the air protocol may be derived from the ReFLEX remote controller directly from the forward channel of the second over the air protocol using a separate ReFLEX forward channel receiver 302 or sniffer receiver that provides timing information te timing processing element 238 in the dual mode base station 222. The processor 2 is preferably programmed to decode timing information from the timing source for the second over the air protocol allowing the multi-mode base receiver 228 to provide a busy indicator (via reverse channel demodulator 230 and busy control element 240) to the transmitter 224 and modulator 226 corresponding to the first over the air protocol. The processor is further programmed to inhibit the reverse channel of the first over the air protocol during a period set by the busy indicator, to configure the reverse channel to receive data in the second over the air protocol at the multi-mode base receiver, to demodulate and decode (via demodulator 232) the reverse channel in the second over the air protocol for a period indicated by the timing information, and configure the reverse channel to receive data in the first over the air protocol after the time indicated by the timing information.

It should be understood that the claimed invention is not limited to just two protocols. A base station in a radio communication system capable of receiving reverse channel data using multiple over the air protocols again comprises a transmitter and modulator for outbound transmissions in at least a first over the air protocol and a multi-mode base receiver capable of receiving data on a reverse channel using multiple over the air protocols including the first over the air protocol and at least a second over the air protocol. The base station further comprises a timing source for at least one of the multiple over the air protocols derived from at least one remote controller respectively corresponding to at least one of the multiple over the air protocols and a processor. The processor is preferably programmed to decode timing information from the timing source for at least one of the multiple over the air protocols allowing the multi-mode base receiver to provide a busy indicator to at least a modulator corresponding to a remainder of the plurality of over the air protocols and to inhibit the remainder of the plurality of over the air protocols during a period set by the busy indicator. The processor if further programmed to configure the reverse channel to receive data in the at least one of the multiple over the air protocols having the timing source at the multi-mode base receiver capable of receiving data on a reverse channel in one of a plurality of protocols, to demodulate and decode the reverse channel in the at least one of the multiple over the air protocols having the timing source for a period indicated by the timing information and to configure the reverse channel to receive data in one of the remainder of the plurality of protocols after the time indicated by the timing information.

Figure 4:
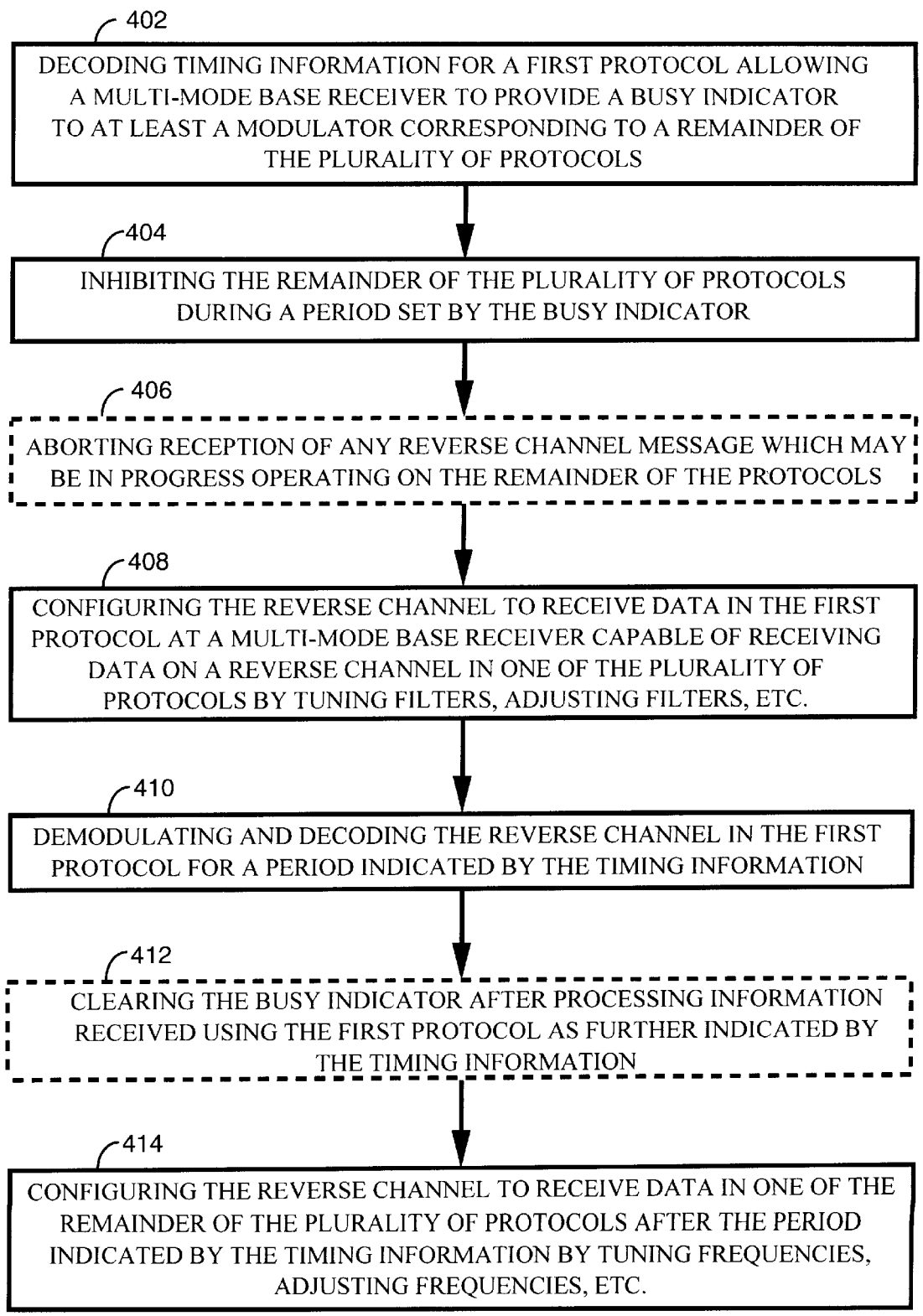
FIG. 4 is a flow chart illustrating a method for multi-protocol reverse channel infrastructure sharing in accordance with the present invention.

Referring to FIG. 4, a flow chart is shown illustrating a method 400 for receiving reverse channel data using a plurality protocols. The method 400 preferably comprises the steps of decoding timing information 402 for a first protocol allowing a multi-mode base receiver to provide a busy indicator to at least a modulator corresponding to a remainder of the plurality of protocols and then inhibiting 404 the remainder of the plurality of protocols during a period set by the busy indicator. It should be kept in mind that if there are multiple protocols being received beyond two, then the timing information should come from each of the respective controllers and the contention over which protocol gets to use the reverse channel should be controlled in a manner likely to reduce latency and the number of collisions. The step of inhibiting may further include the step 406 of aborting reception of any reverse channel message which may be in progress operating on the remainder of the protocols. Next, the reverse channel is configured at step 408 to receive data in the first protocol at a multi-mode base receiver capable of receiving data on a reverse channel in one of the plurality of protocols. At step 410, the reverse channel in the first protocol is demodulated and decoded for a period indicated by the timing information. At this point, the optional step 412 to clear the busy indicator after processing information received using the first protocol may be done as further indicated by the timing information. Finally, at step 414, the reverse channel is configured to receive data in one of the remainder of the plurality of protocols after the period indicated by the timing information. As previously mentioned, the steps of configuring the reverse channel may include the steps of tuning frequencies, adjusting filters, switching modulations schemes among other steps.

Referring again to FIGS. 3 and 4, the remote controller 216 (or RF-C) 15 provides the required timing information to the dual-mode base station 222 preferably using some new timing messages. These new timing messages could be structured several different ways. These timing messages would preferably contain the following information:
Exact time the message is to take effect, i.e. the activation time,
List of affected base stations (including a code indicating all base stations),
Frequency to tune the receiver to,
Flag indicating scheduled vs. aloha period, –Length of time to remain in the second protocol (or ReFLEX mode) before reverting to the first protocol or yet another protocol.

The remote controller creates these messages based upon its existing scheduling algorithms. In other words, somewhat before each ReFLEX aloha interval and before each group of inbound messages scheduled by the RF-C, the RF-C constructs an appropriate timing message and sends it to the remote controller 206 for the first protocol (or the RNC) for forwarding to the affected base stations. The RNC the multiplexes the message (possibly reformatting it to remove the base station list) into the outbound data streams it is sending to the affected base stations. Note that these timing messages are relatively short, and the RNC inserts them into the data stream to the base station with high priority. Even so, there is a possibility that particular timing message could be delayed for the time required to send the largest message between the RNC to the base station. Because of this, the RF-C preferably sends the timing messages about one half second before they are due to take effect. Note that while not necessary to the invention, it would be more effective if the RF-C schedules reverse channel messages for contiguous blocks of time. It should be further noted that the dual-mode base station 222 preferably maintains an accurate real-time clock so that it can synchronize with the timing messages. To effect this, the RNC could send accurate timing indications to the base stations so that they may maintain their real-time clocks to within a few milliseconds.

The "aloha flag" mentioned in the above description of the timing messages is intended to allow the base station to be somewhat smarter about the step of "aborting any in-process RD-LAP message". If the aloha flag is set, the base station could decide to finish receiving the RD-LAP message, if it would only delay the switch to ReFLEX by a few aloha slots. Naturally, if the base station did this, it would have to make appropriate adjustments in the timer to return to RD-LAP.

The present invention uses timing information about pending reverse channel activity of a second protocol to affect the reverse channel status information (i.e. busy indication) of the first protocol. This then allows the two protocols to effectively share the reverse channel and/or reverse channel equipment by coordinating contention for use of the shared resources. Thus, the present invention would permit in the examples illustrated above the addition of a ReFLEX layer to a DataTAC system for the cost of a one-way paging system, i.e. the WMG, RF-C, and transmitters. This would provide a reverse channel with substantial bandwidth for little or no capital or operating costs.

The above description is intended by way of example only and is not intended to limit the present invention in any way except as set forth in the following claims.

What is claimed is:

1. A base station in a radio communication system capable of receiving reverse channel data using two over the air protocols, comprising:
    a transmitter and modulator for forward channel transmissions in at least a first over the air protocol;
    a multi-mode base receiver capable of receiving data on a reverse channel using multiple over the air protocols including the first protocol and at least a second over the air protocol;
    a timing source for the second over the air protocol derived from a remote controller for the second over the air protocol;
    a processor programmed to:
        decode timing information from the timing source for the second over the air protocol allowing the multi-mode base receiver to provide a busy indicator to the transmitter and modulator corresponding to the first over the air protocol;
        inhibit the reverse channel of the first over the air protocol during a period set by the busy indicator;
        configure the reverse channel to receive data in the second over the air protocol at the multi-mode base receiver capable of receiving data on a reverse channel in one of a plurality of protocols;
        demodulate and decode the reverse channel in the second over the air protocol for a period indicated by the timing information; and
        configure the reverse channel to receive data in the first over the air protocol after the time indicated by the timing information.

2. The base station of claim 1, wherein the multi-mode base receiver is capable of receiving data on the reverse channel using RD-LAP as the first protocol and ReFLEX as the second protocol.

3. The base station of claim 2, wherein the timing source for ReFLEX comes from remote controller for ReFLEX.

4. The base station of claim 3, wherein the timing source for ReFLEX comes from a remote controller for ReFLEX via a remote controller for RD-LAP.

5. The base station of claim 2, wherein the timing source for ReFLEX comes from a remote controller for ReFLEX through a separate ReFLEX forward channel receiver.

6. The base station of claim 1, wherein the base station further comprises a demultiplexer for demultiplexing forward channel data of the first over the air protocol and timing information from the remote controller for at least the second protocol through the remote controller for at least the first over the air protocol.

7. The base station of claim 1, wherein the base station further comprises a multiplexer for multiplexing information for at least the second protocol and for the first protocol received through the multi-mode base receiver.

8. A base station in a radio communication system capable of receiving reverse channel data using multiple over the air protocols, comprising:
    a transmitter and modulator for outbound transmissions in at least a first over the air protocol;
    a multi-mode base receiver capable of receiving data on a reverse channel using multiple over the air protocols including the first over the air protocol and at least a second over the air protocol;
    a timing source for at least one of the multiple over the air protocols derived from at least one remote controller respectively corresponding to at least one of the multiple over the air protocols;
    a processor programmed to:
        decode timing information from the timing source for at least one of the multiple over the air protocols allowing the multi-mode base receiver to provide busy indicator to at least a modulator corresponding to a remainder of the plurality of over the air protocols;
        inhibit the remainder of the plurality of over the air protocols during period set by the busy indicator;
        configure the reverse channel to receive data in the at least one of th multiple over the air protocols having the timing source at the multi-mode base receiver capable of receiving data on a reverse channel in one of a plurality of protocols;
        demodulate and decode the reverse channel in the at least one of the multiple over the air protocols having the timing source for a period indicated by timing information; and
        configure the reverse channel to receive data in one of the remainder of the plurality of protocols after the time indicated by the timing information.

9. The base station of claim 8, wherein the multi-mode base receiver is capable of receiving data on the reverse channel using RD-LAP as the first protocol and ReFLEX as the second protocol.

10. The base station of claim 9, wherein the timing source for ReFLEX comes from a remote controller for ReFLEX.

11. The base station of claim 9, wherein the timing source for ReFLEX comes from a remote controller for ReFLEX via a remote controller for RD-LAP.

12. The base station of claim 9, wherein the timing source for ReFLEX comes from a remote controller for ReFLEX through a separate ReFLEX forward channel receiver.

13. The base station of claim 8, wherein the base station further comprises a demultiplexer for demultiplexing forward channel data of the first over the air protocol and timing information from the remote controller for at least the second over the air protocol through the remote controller for at least the first over the air protocol.

14. The base station of claim 8, wherein the base station further comprises a multiplexer for multiplexing information for at least the second protocol and for the first protocol received through the multi-mode base receiver.

15. A method for receiving reverse channel data using a plurality protocols, comprising the steps of:

decoding timing information for a first protocol allowing a multi-mode base receiver to provide a busy indicator to at least a modulator corresponding to a remainder of the plurality of protocols;

inhibiting the remainder of the plurality of protocols during a period set by the busy indicator;

configuring the reverse channel to receive data in the first protocol at a multi-mode base receiver capable of receiving data on a reverse channel in one of the plurality of protocols;

demodulating and decoding the reverse channel in the first protocol for a period indicated by the timing information; and configuring the reverse channel to receive data in one of the remainder of the plurality of protocols after the period indicated by the timing information.

16. The method of claim 15, wherein the method further comprises the step of demodulating and decoding the reverse channel in the one of the remainder of the plurality of protocols as indicated by the timing information.

17. The method of claim 15, wherein the method further comprises the step of clearing the busy indicator after processing information received using the first protocol as further indicated by the timing information.

18. The method of claim 15, wherein the step of inhibiting the remainder of the plurality of protocols further comprises the step of aborting reception of any reverse channel message which may be in progress operating on the remainder of the protocols.

19. The method of claim 15, wherein the step of configuring comprises the step of retuning to a given frequency.

20. The method of claim 15, wherein the step of configuring comprises the step of adjusting filters.

* * * * *